(12) United States Patent
Long

(10) Patent No.: US 9,642,296 B1
(45) Date of Patent: May 9, 2017

(54) LEAF AND DEBRIS COLLECTOR HAVING TWO STAFFS WITH DEBRIS SCOOPS

(71) Applicant: Elton Ray Long, Granbury, TX (US)

(72) Inventor: Elton Ray Long, Granbury, TX (US)

( * ) Notice: Subject to any disclaimer, the term of this patent is extended or adjusted under 35 U.S.C. 154(b) by 0 days.

(21) Appl. No.: 15/234,630

(22) Filed: Aug. 11, 2016

Related U.S. Application Data

(60) Provisional application No. 62/206,563, filed on Aug. 18, 2015.

(51) Int. Cl.
*A01B 1/02* (2006.01)

(52) U.S. Cl.
CPC ...................... *A01B 1/02* (2013.01)

(58) Field of Classification Search
CPC ................. A01B 1/02; A01B 1/026
USPC ......... 294/1.4, 177, 16, 99.2, 51, 54.5, 50.7, 294/50.8, 50.9, 118, 57, 58, 53.4, 53.5; 56/400.12, 400.16; 15/257.7; D8/13
See application file for complete search history.

(56) References Cited

U.S. PATENT DOCUMENTS

| | | | | |
|---|---|---|---|---|
| 541,841 | A * | 7/1895 | Doyle | A01G 23/046 111/101 |
| 1,484,100 | A * | 2/1924 | Wertz | F24B 15/10 294/11 |
| 2,735,712 | A * | 2/1956 | Hart | E21B 11/005 294/50.5 |
| 3,222,699 | A * | 12/1965 | Zeisig | E01H 5/02 294/51 |
| 4,057,277 | A * | 11/1977 | Burkholder | B62B 1/22 294/50.8 |
| 4,400,029 | A * | 8/1983 | Delpidio | A01B 1/18 294/50.9 |
| 4,427,227 | A * | 1/1984 | Haskell | B25B 9/00 294/50.9 |
| 4,953,347 | A * | 9/1990 | Siegfried | A01B 1/00 294/50.8 |
| 5,168,592 | A * | 12/1992 | Jee | B25B 7/12 7/107 |
| 5,303,536 | A * | 4/1994 | Tolliver | A01D 7/10 56/400.12 |
| 5,431,468 | A * | 7/1995 | Rosenshine | B25G 1/00 294/54.5 |
| D582,737 | S * | 12/2008 | Mullen | D8/10 |
| 7,909,375 | B2 * | 3/2011 | Waldman | A47G 21/10 294/16 |

* cited by examiner

*Primary Examiner* — Paul T Chin
(74) *Attorney, Agent, or Firm* — Plager Schack LLP

(57) ABSTRACT

A debris collector for collecting leaves and debris may include a first staff having a first handle attached to a first end thereof and a first shovel scoop attached to a second end thereof; a second staff having a second handle attached to a first end thereof and a second shovel scoop attached to a second end thereof; and a spring clamp connector attaching the first staff to the second staff such that when the first handle and the second handle are pushed together, the first shovel scoop moves away from the second shovel scoop; and when the first handle and the second handle are released, the first shovel scoop and the second shovel scoop clamp together.

5 Claims, 4 Drawing Sheets

LEAF AND DEBRIS COLLECTOR HAVING TWO STAFFS WITH DEBRIS SCOOPS

RELATED APPLICATION

This application claims priority to provisional patent application U.S. Ser. No. 62/206,563 filed on Aug. 18, 2015, the entire contents of which is herein incorporated by reference.

BACKGROUND

The embodiments herein relate generally to lawn care tools, and more particularly, to a lawn care tool to easily and safely collect leaves and debris for containment.

Every autumn, leaf raking and collection can be a backbreaking chore that is difficult and time consuming for owners of properties both large and small. Elderly people or people with decreased strength especially have a hard time with this task. Conventional tools for collecting leaves include rakes. However, the wind frequently blows the leaves off and out of a rake. Moreover, once leaves are raked into a pile, the individual still has to find a way to contain and dispose of the leaves.

Therefore, what is needed is a device that allows for quick and efficient collection of a large amount of leaves or other debris by a single person.

SUMMARY

Some embodiments of the present disclosure include a debris collector for collecting leaves and debris. The debris collector may include a first staff having a first handle attached to a first end thereof and a first shovel scoop attached to a second end thereof; a second staff having a second handle attached to a first end thereof and a second shovel scoop attached to a second end thereof; and a spring clamp connector attaching the first staff to the second staff such that when the first handle and the second handle are pushed together, the first shovel scoop moves away from the second shovel scoop; and when the first handle and the second handle are released, the first shovel scoop and the second shovel scoop clamp together.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
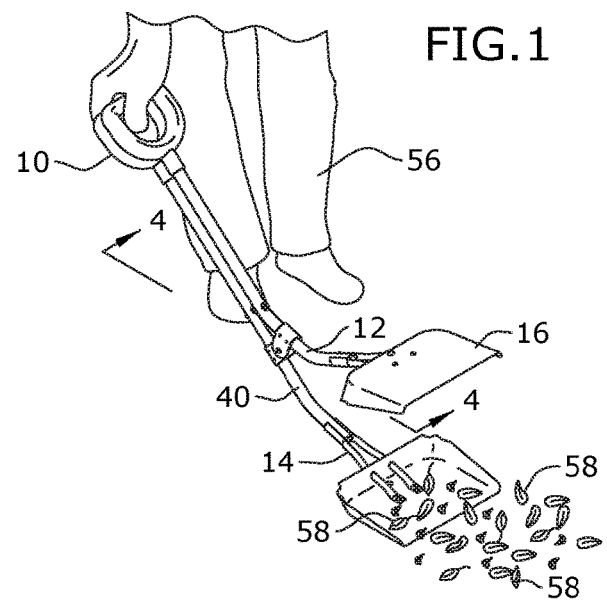
FIG. 1 is a perspective view of one embodiment of the present disclosure, shown in use.
Figure 2:
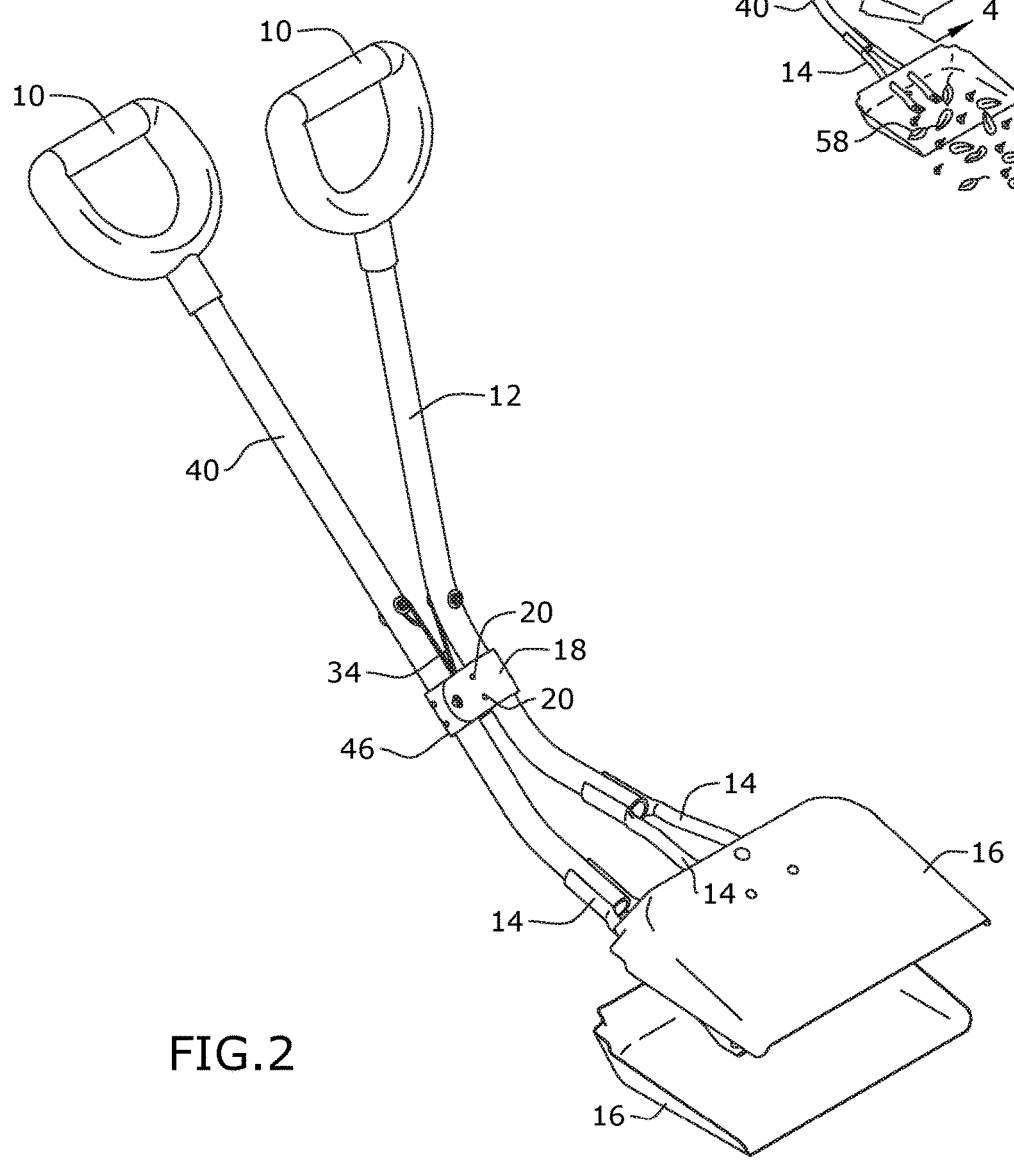
FIG. 2 is a perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to collect leaves and other debris and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. First Staff with Shovel Scoop
2. Second Staff with Shovel Scoop
3. Spring Clamp Connector The various elements of the device of the present disclosure may be related in the following exemplary fashion. It is not intended to limit the scope or nature of the relationships between the various elements and the following examples are presented as illustrative examples only.

By way of example, and referring to FIGS. 1-7, some embodiments of the present disclosure include a debris collector configured to collect leaves and other debris, the debris collector comprising a first staff 12 with a first handle 10 attached to a first end thereof and a first shovel scoop 16 attached to a second end thereof; a second staff 40 with a second handle 10 attached to a first end thereof and a second shovel scoop 16 attached to a second end thereof; and a spring clamp connector attaching the first staff 12 to the second staff 40 such that, when the first handle 10 and the second handle 10 are pushed together, the first shovel scoop 16 moves away from the second shovel scoop 16 and, when the handles 10 are released, the shovel scoops 16 clamp together.

Figure 3:
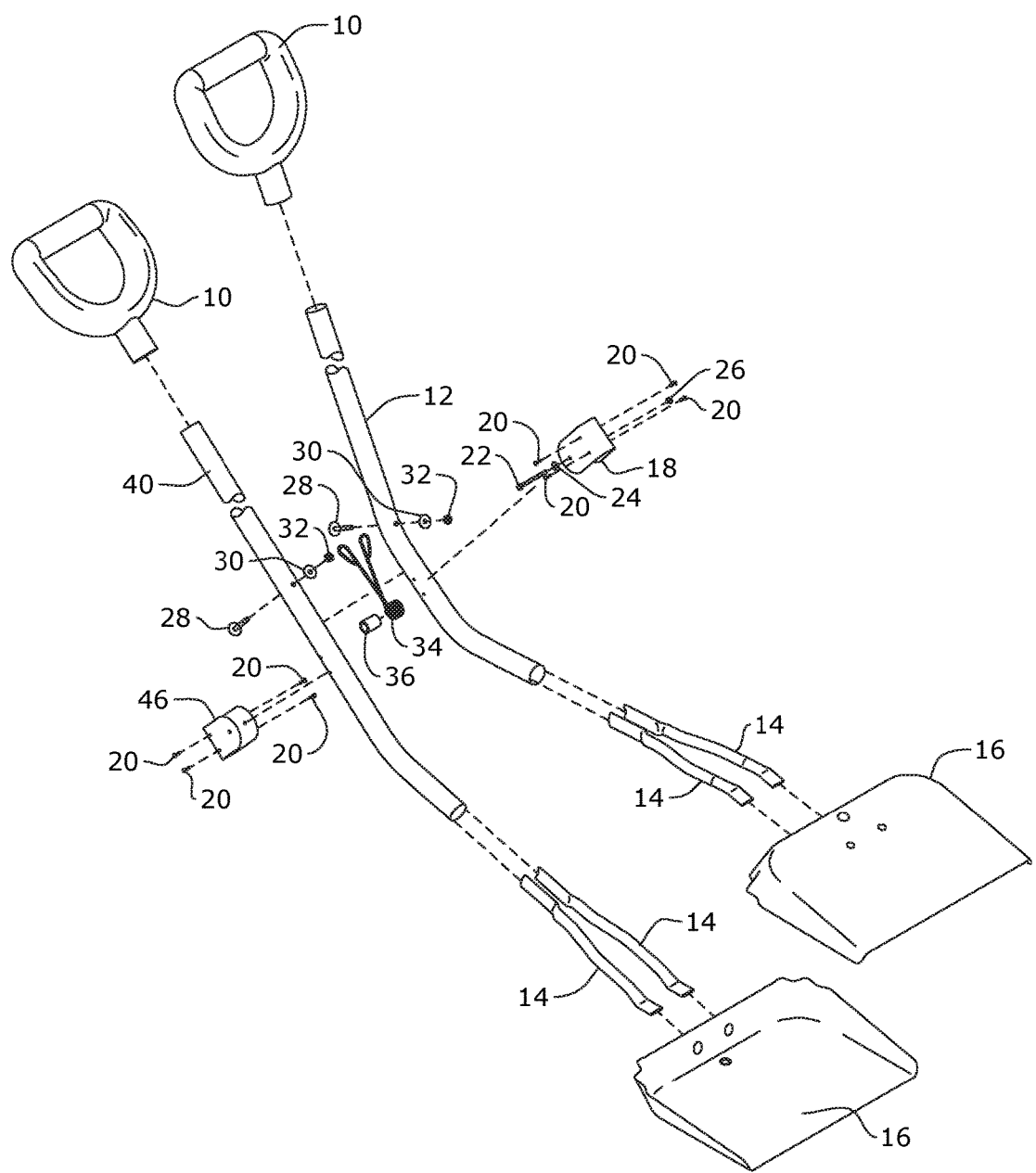
FIG. 3 is an exploded view of one embodiment of the present disclosure.
Figure 5:
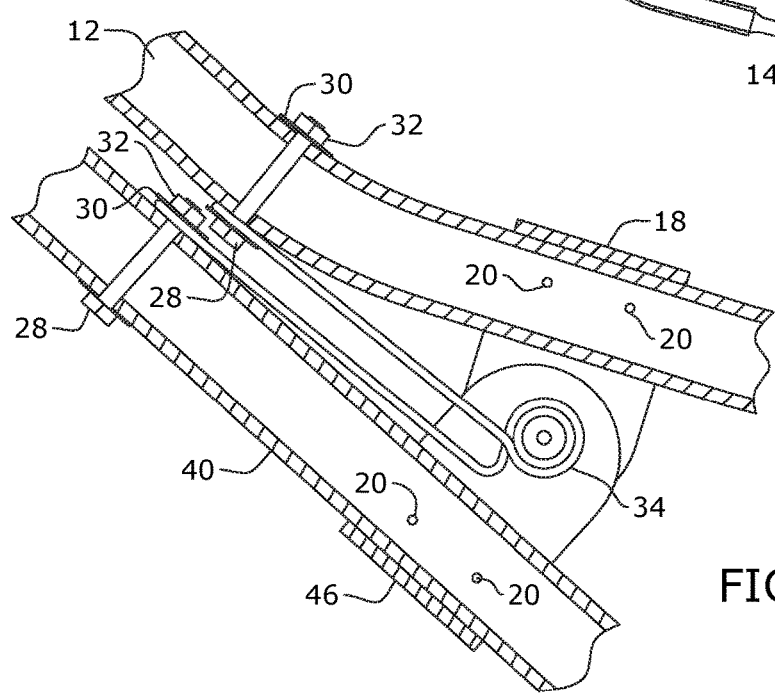
FIG. 5 is an enlarged section view of one embodiment of the present disclosure.
Figure 6:
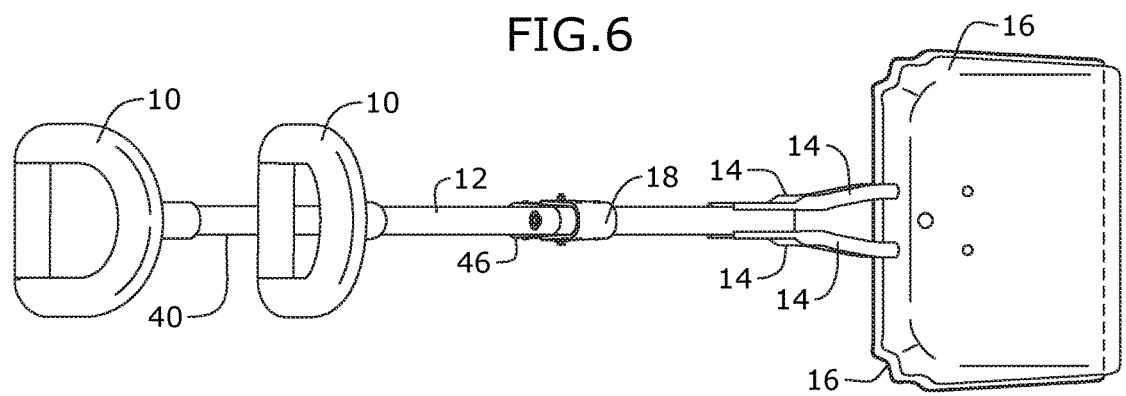
FIG. 6 is a top view of one embodiment of the present disclosure.
Figure 7:
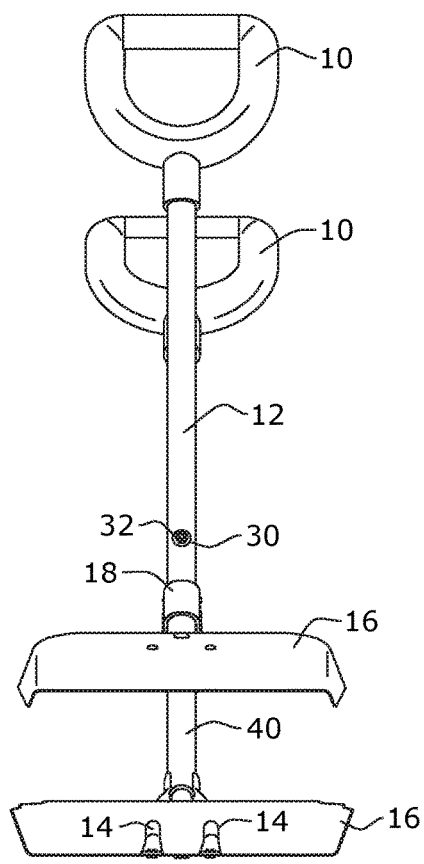
FIG. 7 is a front view of one embodiment of the present disclosure.

As shown in FIGS. 3 and 5, the spring clamp connector may comprise a spring 34 having a coiled center and two looped ends, the two looped ends being positioned proximate to each other and distal from the coiled center. A sheath 36 may extend through the coiled center of the spring 34 and attach to a first bracket 18 and a second bracket 46, wherein the first bracket 18 is attached to the first staff 12 and the second bracket 46 is attached to the second staff 40. As shown in the Figures, the brackets 18, 46 may each be substantially U-shaped with a diameter sufficient to accommodate the respective staff 12, 40, and each bracket 18, 46 may be attached to its respective staff 12, 40 by at least one fastener, such as by a plurality of screws 20. A first end of each bracket 18, 46 may attach to the other bracket 18, 46 proximate to the sheath 36. A first looped end of the spring 34 may be attached to the first staff 12, and a second looped end of the spring 34 may be attached to the second staff 40. In some embodiments, each of the looped ends of the spring 34 may be attached to its respective staff 12, 40 using a flange bolt 28 configured to extend through the looped end and the respective staff 12, 40 and attach to a washer 30 and a nut 32 on a side of the staff 12, 40 opposite the spring 34. As shown in the Figures, the looped ends of the spring 34 may be positioned on their respective staffs 12, 40 closer to the handles 10 than the coiled center of the spring 34. As such, the coiled center of the spring 34 may be positioned closer to the shovel scoop 16 than the looped ends. As mentioned above, the spring clamp connector may be attached to the staffs 12, 40 in such a manner that, when the handles 10 are pushed together, the shovel scoops 16 are forced apart and, when the handles are released, the shovel scoops 16 clamp shut.

Figure 4:
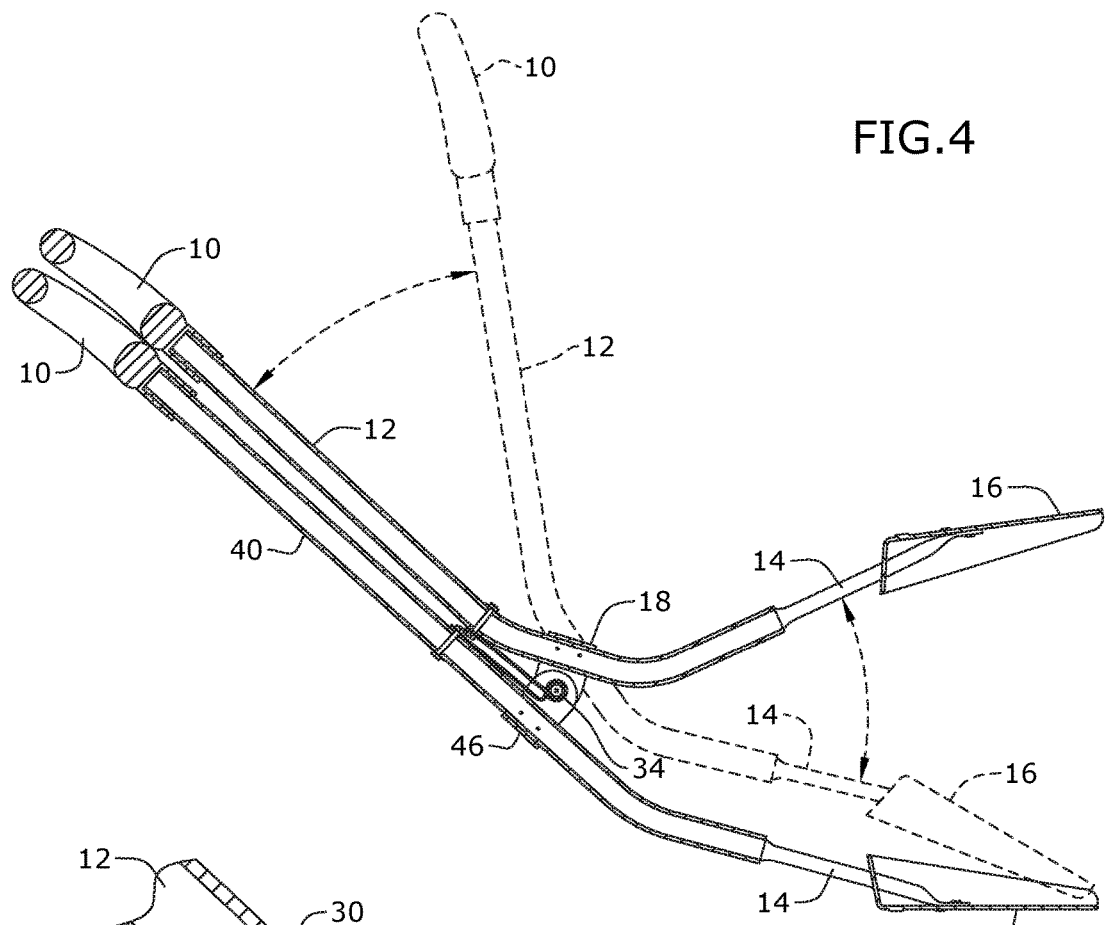
FIG. 4 is a section view of one embodiment of the present disclosure, taken along line 4-4 in FIG. 1.

As shown, for example, in FIG. 4, the first staff 12 may comprise two bends, wherein the first bend is proximate to the location at which the looped end of the spring 34 is attached, and the second bend may be located closer to the shovel scoop 16. The shovel scoop 16 may open away from the bends and toward the second shovel scoop 16. On the other hand, the second staff 40 may only comprise a single bend, wherein the shovel scoop 16 on the second staff may open toward the bend and toward the first shovel scoop 16. Thus, the first staff 12 and the second staff 40 may have different shapes. The different bends and angling of the staffs 12, 40 may make cleaning up leaves and debris easier for a user 56.

The shovel scoops 16 may be attached to their respective staff 12, 40 using any suitable connection and, in some embodiments, the shovel scoops 16 are attached to attachment arms 14 by, for example, screws, and the attachment arms 14 are attached to the staff 12, 40 by, for example, a pair of screws.

To use the device of the present disclosure, a user 56 may squeeze the handles 10 together to open the shovel scoops 16. The user 56 may then use the shovel scoops 16 to scoop up leaves 58 or other debris. The user 56 may then release the handles 10, causing the shovel scoops 16 to clamp together and secure the leaves 58 and debris between the shovel scoops 16. If desired, the user 56 may then position the device over a collection area, such as a barrel, dumpster, or bag, and squeeze the handles 10 together to release the leaves 58 and other debris.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A debris collector for collecting leaves and debris, the debris collector comprising:
    a first staff having a first handle attached to a first end thereof and a first shovel scoop attached to a second end thereof;
    a second staff having a second handle attached to a first end thereof and a second shovel scoop attached to a second end thereof; and
    a spring clamp connector attaching the first staff to the second staff such that:
        when the first handle and the second handle are pushed together, the first shovel scoop moves away from the second shovel scoop; and
        when the first handle and the second handle are released, the first shovel scoop and the second shovel scoop clamp together,
    wherein:
        the first staff and the second staff have a different shape;
        the second staff comprises one bend; and
        the first staff comprises two bends, such that when the first handle and the second handle are released, a first bend in the first staff causes the first handle to be spaced from the second handle and a second bend in the first staff aligns with the one bend in the second staff.

2. The debris collector of claim 1, wherein the spring clamp connector comprises:
    a spring having a coiled center and two looped ends, a first looped end attached to the first staff and a second looped end attached to the second staff;
    a sheath extending through the coiled center and attached to a first bracket and a second bracket, wherein the first bracket is attached to the first staff and the second bracket is attached to the second staff.

3. The debris collector of claim 2, wherein the first bracket and the second bracket are each substantially U-shaped with a diameter sufficient to accommodate the first staff and the second staff, respectively.

4. The debris collector of claim 2, wherein:
    the first looped end is attached to the first staff closer to the first handle as compared to the center coil; and
    the second looped end is attached to the second staff closer to the second handle as compared to the center coil.

5. The debris collector of claim 1, wherein:
    the first shovel scoop opens away from the two bends on the first staff; and
    the second shovel scoop opens toward the one bend on the second staff.

* * * * *